Aug. 24, 1954

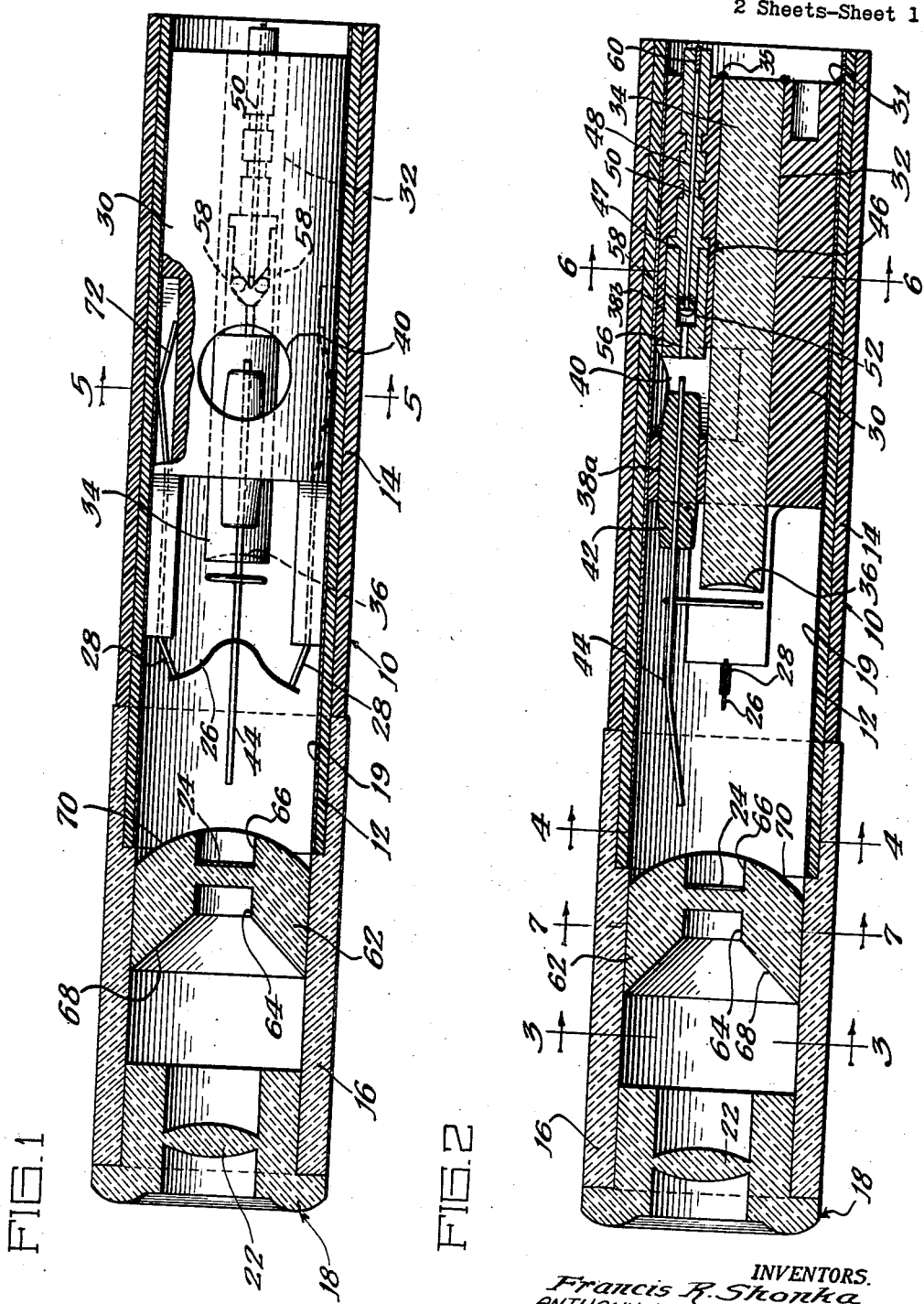

F. R. SHONKA ET AL 2,687,480

RADIATION MEASURING DEVICE

Filed Aug. 18, 1952

INVENTORS.
Francis R. Shonka
ANTHONY J. OKLESHEN AND
RICHARD F. SELMAN

By Roland A. Anderson

Attorney

Patented Aug. 24, 1954

2,687,480

UNITED STATES PATENT OFFICE 2,687,480

RADIATION MEASURING DEVICE

Francis R. Shonka, Riverside, Anthony J. Okleshen, Lemont, and Richard F. Selman, Chicago, Ill., assignors to the United States of America as represented by the United States Atomic Energy Commission Application August 18, 1952, Serial No. 304,952

10 Claims. (Cl. 250—83.6)

This invention relates to radiation measuring devices, and more particularly to portable radiation measuring devices which are suitable for measuring the radiation dosage that a person receives during a period of time.

The health of personnel handling radioactive materials may be jeopardized if precautions are not taken to limit the amount of radiation that each workman receives to permissible amounts. One of the best ways to ascertain the amount of radiation to which a workman has been subjected is for the workman to carry a radiation dosimeter. These devices have ionization chambers which may be charged before use, and often include electrometers and optical systems focusing upon the electrometers. Incident radiation discharges the ionization chamber and causes the electrometer to change its indication. In this manner, a workman with radioactive materials is able to have an accurate estimate of the radiation he has absorbed during the period he has carried the dosimeter. As the number of people engaged in handling radioactive materials has increased, the demand for dosimeters suitable for this purpose has also increased. This has led those working in the art to strive to provide radiation dosimeters which may be more readily and cheaply constructed. One such radiation dosimeter is disclosed in the patent application of Francis R. Shonka, Serial No. 228,713, filed May 28, 1951, now U. S. Patent No. 2,634,374.

The optical systems used to focus upon the electrometer in the dosimeters of the past have proven to be one of the expensive components of the instrument. In order to limit the color aberration to tolerable limits, it has been necessary to use lenses which are relatively costly. It is thus an object of the present invention to provide a radiation measuring device with an optical system utilizing relatively inexpensive lenses and maintaining color aberration to permissible limits.

Most of the radiation dosimeters being employed at present require a charging potential to be placed upon the ionization chamber, thereby setting the electrometer at the zero position. As this charge leaks off of the electrometer due to the effects of incident radiation, the electrometer indicates the magnitude of the incident radiation by moving from the zero position. It is thus necessary to set each dosimeter to zero before a measurement is to be taken. The dosimeters previously used require charging potentials which are properties of the individual instruments, and are not adjustable. It is thus clear, that the task of charging a fairly large number of dosimeters periodically is greatly complicated by the use of different charging potentials for each dosimeter. Hence, another object of the present invention is to provide a radiation measuring device which may be constructed in quantities and will have a charging potential which may be adjusted, so that all such instruments may be charged at a common potential.

Further, the electrometers of most of the dosimeters previously used had to be individually calibrated to a scale, since the sensitivity of the instrument was not adjustable. It is also an object of the present invention to provide a radiation measuring device with adjustable sensitivity, so that a prefabricated scale can be used in the device to directly measure the quantity of radiation which has been incident thereon.

The man skilled in the art will readily foresee many other objects and advantages of the present invention upon a further reading of the specification and claims, particularly when viewed in the light of the drawings, in which:

Figure 1 is a longitudinal sectional view of a dosimeter constructed in accordance with the present invention;

Figure 2 is also a longitudinal sectional view of the dosimeter shown in Figure 1 taken on a plane normal to the plane of Figure 1;

Figure 3:
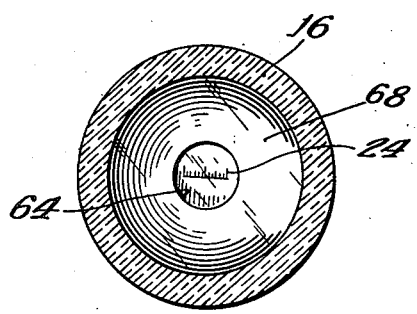
Figure 3 is a transverse sectional view of the dosimeter taken along line 3—3 of Figure 2.
Figure 4:
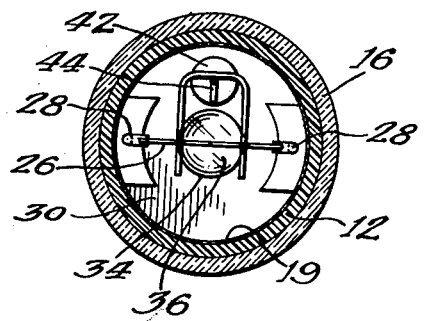
Figure 4 is a transverse sectional view of the dosimeter taken along line 4—4 of Figure 2.
Figure 5:
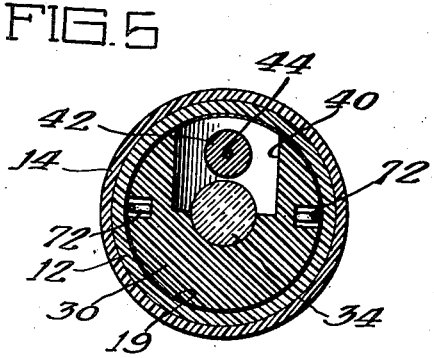
Figure 5 is a transverse sectional view taken along line 5—5 of Figure 1.
Figure 6:
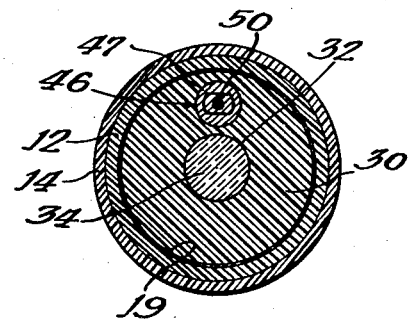
Figure 6 is a transverse sectional view of the dosimeter taken along line 6—6 of Figure 2.
Figure 7:
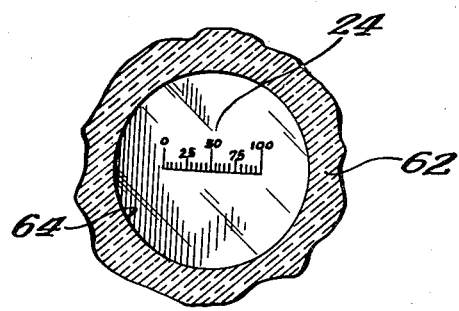
Figure 7 is a transverse sectional view taken along line 7—7 of Figure 2.

The dosimeter is provided with a hermetically sealed casing 10 which is tubular in shape. The casing 10 is formed by an inner sleeve 12 surrounded by an outer sleeve 14, a transparent tube 16 attached to the end of the sleeves 12 and 14, and an eyepiece 18 disposed at one end of the transparent tube 16. The casing 10 must be transparent to particles and radiations. An electrically conducting layer 19 is disposed on the interior of the casing 10. The layer 19 may be graphite and grease in the region of the ionization chamber, thus forming a dust trap in the instrument. In a particular embodiment of the present invention, the inner sleeve 12 is constructed of $\frac{1}{32}$ inch Bakelite tubing, and the outer sleeve 14 is constructed of cellulose acetate butyrate plastic, which is clear and resists impacts well. A layer of rubber adhesive between the sleeves 12 and 14 forms them into a strong shock resistant structure. The transparent tube 16 is also constructed of the cellulose acetate butyrate plastic, but the eyepiece 18 is constructed of clear polystyrene.

A lens 22 is integrally cast in the eyepiece 18. The eyepiece 18 is secured and sealed to the open end of the transparent tube 16. A reticle scale 24 is also mounted within the transparent tube 16.

A fiber 26 is mounted within the casing 10 by means of a fiber support 28 and a cylinder 30 concentrically disposed within the inner sleeve 12, the fiber support 28 being affixed to the cylinder 30. The fiber must be electrically conducting, and may be a silver coated quartz fiber. The cylinder 30 is constructed of an electrically insulating material, such as Bakelite. The cylinder is slidably disposed within the casing 10, but is secured and sealed to the casing 10 by a layer of cement 31, or other means.

A bore 32 is provided along the axis of the cylinder 30, and a rod 34 is disposed within the bore 32. The rod 34 is also slidable within the cylinder 30, and is secured and sealed by a layer of cement 35, or other means. The rod 34 is provided with a concave surface 36 on the end adjacent to the fiber 26. The concave surface 36 is a light reflecting surface and is disposed with its center of curvature slightly displaced from the axis of the rod 34. The concave surface 36 forms a reflecting objective for the optical system. The rod 34 may be constructed of polystyrene, and the concave surface 36 coated with silver.

A second bore 38 is disposed parallel to the axis of the cylinder 30 between the bore 32 and the periphery of the cylinder. This bore 38 is separated into two portions 38a and 38b by a transverse aperture 40 which intersects the bore 38. An insulator 42 is disposed in the portion of the bore 38a adjacent to the fiber 26 and supports the deflecting electrode 44 of the ionization chamber. The deflecting electrode 44 extends through the insulator 42 into the aperture 40.

A contacting device 46 is disposed in the other portion of the bore 38b. The contacting device 46 has a housing 47 provided with a bore 48 extending along the axis of the bore 38 and containing a rod 50 constructed of ferromagnetic electrically conducting material. The housing 47 also is provided with a Y-shaped slot 52 having a mouth 56 adjacent to the end of the deflecting electrode 44. Two non-magnetic balls 58 are disposed in the slot 52. The balls 58 have diameters sufficiently small to allow them free passage within the slot 52, but too great to allow the balls to travel from the mouth 56 of the slot 52. The bore 48 in the housing 47 is closed with a plug 60 at the end opposite to the slot 52, this plug being constructed of magnetic material. The rod 50 and the plug 60 are oppositely polarized and are attracted to each other. The housing 47 may be constructed of any non-magnetic material, such as brass or plastic. If constructed of an electrically conducting material, it will not be necessary to provide an additional electrical connection to the rod 50. The rod 50 must be electrically conducting, and may be iron or steel.

The contacting device 46 has been provided to isolate the electrode 44 from the exterior of the casing 10 of the dosimeter, so that the dosimeter will not be able to discharge during operation due to conditions at the surface thereof, thus giving more reliable readings of incident radiation. In order to charge the dosimeter, the dosimeter is held vertically, that is with the electrode 44 above the contacting device 46. Thus, the non-magnetic balls 58 fall away from the mouth 56 of the Y-shaped slot 52 of the contacting device 46. A magnetic field is applied to the ferromagnetic rod 50 within the contacting device 46 and raises the rod 50 through the bore 48 and slot 52 into contact with the electrode 44, in a manner similar to that described in the copending application of Francis R. Shonka, Serial No. 228,718, referenced above. When the housing 47 of the contacting device 46 is constructed of electrically conducting material, it may be used as a terminal on the exterior of the casing 10 for the electrode 44, the electrically conducting layer 19 being the other terminal. It is also to be noted, that accidental contact of the rod 50 with the electrode 44 is prevented due to the magnetic attraction between the plug 60 and the rod 50, as well as the interference of the balls 58 in the slot 52.

As stated above, the reticle 24 is disposed within the transparent tube 16. This is accomplished by securing an insert 62 of moldable transparent plastic within the transparent tube 16. Cylindrical recesses 64 and 66 are disposed on opposite sides of the insert 62 along the optical axis of the instrument, as shown in Figures 1 and 2. The reticle scale 24 is disposed within the recess 66 adjacent to the fiber 26. The surface 68 of the insert 62 extending from recess 64 to the transparent tube 16 is conical, and the surface 70 adjoining the recess 66 is spherical in shape. As a result, the surface 68 permits the insert 62 to function in the manner of a prism to direct light entering through the transparent tube 16 in the direction of the fiber 26, while the spherical surface 70 focuses the light thus directed upon the fiber 26. In this manner, the most efficient use is made of the available light to illuminate the fiber 26. It has been found that polystyrene is a good material for insert 62.

The reflecting surface 36 of the rod 34 focuses the fiber 26 upon the reticle 24. In order to do so, the fiber 26 must be positioned between the radius of curvature and the focal point of the reflecting surface 36, according to the principles of optics. Further, decreasing the distance between the surface 36 and the fiber 26 within the range between the center of curvature and the focal point of the surface 36 increases the magnification of the lens system. The ocular lens 22 is also focused upon the reticle 24, thus further magnifying the image of the fiber 26.

As stated above, the interior surface of the inner sleeve 12 is coated with an electrically conducting composition 19, such as a mixture of graphite and grease. The fiber 26 is electrically connected to this electrically conducting surface by means of contacting springs 72 which are a portion of the fiber support 28. Thus, the ionization chamber of the dosimeter is formed with an outer electrode formed by the electrically conducting composition 19 on the inner surface of the inner sleeve 12 and deflecting electrode 44. When the dosimeter is assembled, it is necessary to adjust the instrument to make the image of the fiber 26 cover the reticle scale 24 in response to a predetermined amount of radiation with a particular electrical charge upon the instrument. This requires the sensitivity of the ionization chamber or the magnification of the optical system, or both, to be adjusted to give the desired fiber image travel upon the scale 24. However, both the optical magnification and the sensitivity of the ionization chamber are varied in the same direction by moving the cylinder 30 along the axis of the casing 10. As a result, moving the cylinder 30 along the axis of the casing 10 combines the correction of the fiber image travel on the scale 24 caused by a change in the optical magnification of the instrument with the change caused by the change in the radiation sensitivity of the ionization chamber. For example, if the image travel upon the scale 24 for a given amount of radiation is insufficient, the cylinder 30 is moved in a direction away from the scale 24, thereby increasing the volume of the ionization chamber and increasing the amount of deviation that the fiber will make for a given quantity of radiation. In order to focus the image of the fiber upon the scale 24, the rod 34 must be moved to place the concave surface 36 closer to the fiber 26. This increases the optical magnification of the dosimeter, thereby magnifying the deflections of the fiber 26.

It is also necessary to calibrate the instrument by setting the fiber image at zero on the scale 24 when the dosimeter is fully charged. This is accomplished by rotating the rod 34 within the cylinder 30. The center of curvature of the concave surface 36 is displaced from the axis of the rod 34, and therefore rotation of the rod 34 is effective to move the image across the scale 24.

After these adjustments have been completed, the rod 34 is secured to the cylinder 30 by means of a layer of cement 35 disposed between these elements, as shown in Figures 1 and 2. The cylinder 30 is also secured to the casing 10 by means of a layer of cement 31. The layers of cement 31 and 35 not only securely affix the rod 34 to the cylinder 30 and the cylinder 30 to the casing 10, but also hermetically seal the ionization chamber of the dosimeter from the ambient atmosphere. If it again becomes necessary to calibrate the dosimeter, the layers of cement 31 and 35 may be removed, and the calibration operations repeated.

In a particular construction of the dosimeter, the distance between the ocular lens 22 and the reticle scale 24 is ½ inch, the ocular lens 22 having a $\frac{3}{32}$ inch focal length. The distance between the reticle scale 24 and the fiber 26 is approximately ¾ of an inch. The distance between the fiber 26 and the concave surface 34, which is the objective is slightly greater than $\frac{3}{32}$ of an inch, and the focal length of the objective is approximately $\frac{3}{32}$ of an inch. Also, the concave surface 36 is approximately 0.005 inch off center, so that rotating the rod 34 in the bore 32 moves the image of the fiber 26 on the recticle scale 24, and can be used to set the fiber at zero. The total optical power of the optical system of the dosimeter is approximately 120 to 160.

The fiber 26 used for the electrometer is more fully described in the copending patent application of Francis R. Shonka and Anthony J. Okleshen, Serial No. 225,635, filed May 10, 1951.

It is readily apparent that the dosimeter described above may be readily assembled and quickly calibrated. Further, chromatic aberration has been essentially eliminated even though inexpensive optical elements are used, since the objective is a reflector and thus does not exhibit this characteristic. It is of course understood that the particular construction of the dosimeter described above is merely illustrative of the invention, and it is intended that the scope of the invention be limited only by the appended claims.

What is claimed is:

1. A radiation measuring device comprising, in combination, an elongated casing, an ionization chamber having a pair of electrodes disposed within the casing, an electrometer electrically connected to one of the electrodes, and optical means for viewing the electrometer comprising an eyepiece at one end of the casing, means for directing light upon the electrometer, and a reflecting concave surface disposed adjacent to the electrometer on the side opposite to the eyepiece, the electrometer being at a distance from the concave surface between the focal length and the radius of the curvature of the concave surface.

2. A radiation measuring device comprising the elements of claim 1 wherein the means for directing light upon the electrometer comprises a transparent member disposed between the eyepiece and the electrometer provided with a conical surface on the side adjacent to the eyepiece and a spherical surface on the side adjacent to the electrometer, and a transparent window within the casing adjacent to the member, whereby light entering through the transparent window is reflected by the conical surface and focused upon the electrometer by the spherical surface.

3. A radiation measuring device comprising the elements of claim 2 wherein the transparent member is provided with a reticle scale disposed centrally thereof.

4. A radiation measuring device having a casing, an ionization chamber within the casing provided with a pair of electrodes, an electrometer electrically connected to one of the electrodes, and an optical system mounted within the casing for viewing the electrometer including a scale characterized by the construction comprising means slidably disposed within the casing for changing the volume of the ionization chamber, means mounting the electrometer to the volume changing means, and a reflecting objective mounted upon the volume changing means, said objective forming an image of the fiber upon the scale.

5. A radiation measuring device comprising the elements of claim 4 wherein the reflecting objective is positionable relative to the electrometer.

6. A radiation measuring device comprising, in combination, an elongated casing, at least a portion of said casing being electrically conducting, an eyepiece disposed at one end of the casing, an electrode mounted within the electrically conducting portion of the casing, the electrode and electrically conducting portion of the casing forming the electrodes of an ionization chamber, a solid member slidably disposed in the end of the casing opposite to the eyepiece for changing the volume of the ionization chamber, an electrometer electrically connected to one of the electrodes of the ionization chamber, means affixing the electrometer to the member and mounting the electrometer between the member and the eyepiece, a transparent scale mounted within the casing between the electrometer and the eyepiece, a reflecting objective for focusing the electrometer on the scale, and means mounting the reflecting objective to the member.

7. A radiation measuring device comprising, in combination, an elongated casing, at least a portion of said casing being electrically conducting, an eyepiece disposed at one end of the casing, an electrode mounted within the electrically conducting portion of the casing, the electrode and electrically conducting portion of the casing forming the electrodes of an ionization chamber, a solid member slidably disposed in the end of the casing opposite to the eyepiece for changing the volume of the ionization chamber, an electrometer electrically connected to one of the electrodes of the ionization chamber, means affixing the electrometer to the member and mounting the electrometer between the member and the eyepiece, a transparent scale mounted within the casing between the electrometer and the eyepiece, and a rod slidably disposed within the member having a concave reflecting surface adjacent to the electrometer, said reflecting surface focusing an image of the electrometer upon the scale.

8. A radiation measuring device comprising the elements of claim 7 wherein the concave reflecting surface at the end of the rod has a center of curvature disposed off of the axis of the rod.

9. A radiation measuring device comprising the elements of claim 7 in combination with means to secure the member to the casing, and means to secure the rod to the member.

10. A radiation measuring device comprising, in combination, an elongated cylindrical casing, a portion of said casing adjacent to one end thereof being transparent and the remainder of said casing being electrically conducting, a transparent insert disposed within the transparent portion of the casing adjacent to the electrically conducting portion thereof, said insert having a spherical surface adjacent to the electrically conducting portion of the casing and a conical surface, and said insert including a reticle scale disposed centrally thereof, an eyepiece mounted at the transparent end of the casing focused upon the reticle scale, a cylindrical solid member slidably disposed within the electrically conducting end of the casing, an electrically conducting fiber, means mounting the fiber to the member and positioning the fiber centrally within the casing between the member and the scale, said means electrically connecting the fiber with the electrically conducting portion of the casing, an electrode disposed within the electrically conducting portion of the casing adjacent to the fiber and insulatingly mounted to the cylindrical member, and a rod slidably disposed along the axis of the cylindrical member, said rod having a concave reflecting surface disposed adjacent to the fiber, the center of curvature of the reflecting surface being disposed from the axis of the rod, means to seal the rod to the cylindrical member, and means to seal the cylindrical member to the casing.

References Cited in the file of this patent

UNITED STATES PATENTS

| Number | Name | Date |
|---|---|---|
| 1,855,669 | Glasser et al. | Apr. 26, 1932 |
| 2,594,660 | Lauritsen | Apr. 29, 1952 |
| 2,623,184 | Montgomery et al. | Dec. 23, 1952 |